United States Patent [19]

Nicol

[11] 4,027,331
[45] May 31, 1977

[54] DIGITAL TELEVISION SYSTEM

[75] Inventor: Richard Charles Nicol, London, England

[73] Assignee: The Post Office, London, England

[22] Filed: July 24, 1975

[21] Appl. No.: 598,634

[30] Foreign Application Priority Data

Aug. 2, 1974 United Kingdom ............ 34206/74

[52] U.S. Cl. .............................. 358/135; 358/136
[51] Int. Cl.² ......................................... H04N 7/12
[58] Field of Search ................. 178/DIG. 3, 6, 6.8; 358/135, 136, 85; 325/38 B

[56] References Cited

UNITED STATES PATENTS

| 3,715,483 | 2/1973 | Limb | 178/DIG. 3 |
| 3,716,667 | 2/1973 | Connor | 178/DIG. 3 |
| 3,720,786 | 3/1973 | Cutter | 178/DIG. 3 |

Primary Examiner—Robert L. Griffin
Assistant Examiner—Edward L. Coles
Attorney, Agent, or Firm—Hall & Houghton

[57] ABSTRACT

A digital transmission system for television signals in which signals are transmitted only in respect of picture elements which differ from those in the preceding frame, the signals being in differential pulse code modulation form and means is provided for smoothing the transistion between those parts of a frame which are to be updated by the signals and those parts which are unchanged.

15 Claims, 6 Drawing Figures

DIGITAL TELEVISION SYSTEM

This invention relates to digital television and has particular but not exclusive reference to a television system for transmitting video-telephone signals.

In the transmission of video signals over a line it is important to restrict as far possible the bandwidth occupied by the video signals so that economical use can be made of the lines. Various proposals have been made for reducing the bandwidth occupied by a television video signal, one of which is to sample the video signal at intervals and produce a pulse code modulated signal representing the successive differences between adjacent samples. Such a system is more efficient than the video signal itself at carrying the information relating to the image, but it is less efficient than interframe coding in which only those parts of the image that change from one frame to the next are transmitted. A disadvantage with the latter scheme is that it requires a considerable amount of equipment for storage of an entire image, parts of which are updated in response to the transmitted signals.

One proposal of the use of interframe coding that has been made uses a frame memory for storing the image in which the brightness of the picture elements of the image is recorded in the memory. In view of the fact that a differential pulse code modulation (D.P.C.M.) system requires less equipment at the terminal stations, it is desirable that such a system be used for the shorter routes where less efficient use of the lines is economically tolerable and the more complex interframe coding used for the trunk network in which more expensive terminal equipment is justified. With the transmission of video data on the shorter routes in DPCM coding it is necessary to convert to pulse code modulation (PCM) for the trunk network to update the frame memories. Thus video data would probably first be transmitted over a short route using DPCM. then over the trunk network using PCM and finally over a second short route using DPCM again. This means that the video signals are subjected to recoding from DPCM to PCM and from PCM to DPCM in every transmission path with a consequent degradation of the fidelity of the video information.

It is an object of the present invention to overcome this difficulty.

According to one aspect of the present invention there is provided a digital television system having a transmitter for transmitting digital signals depending on the light intensity of consecutive reproducing elements of a scanned image, and a receiver for reproducinng the image in response to the digital signals, in which both the transmitter and the receiver include storage means for storing digit groups respectively relating to the intensities in the picture elements constituting one frame of the image and the transmitter further includes means for detecting changes in intensity of picture elements from one frame to the next and for producing in each frame period digital signals for updating at least the corresponding digit groups stored in the storage means, means responsive to the digital signals for updating digit groups stored in the storage means in the transmitter and for transmitting the digital signals to the receiver for updating digit groups stored in the storage means therein, wherein each digital signal represents the difference in intensity between the particular picture element and a preceding picture element having a predetermined spacing from the particular element of the image in the same frame, and means is provided for controlling the means for producing digital signals to smooth the transitions between the updated and unaltered digit groups.

According to a second aspect of the invention there is provided a digital television transmitter system for transmitting digital signals depending on the light intensity in consecutive picture elements of a scanned image, the transmitter system including means for storing digit groups respectively relating to the intensities in the picture elements constituting one frame of the image, means for detecting changes in intensity in the picture elements from one frame to the next and for producing in each frame period digital signals for updating at least the corresponding digit groups stored in the storage means, means responsive to the digital signals for updating digit groups stored in the storage means, and means for transmitting the signals, wherein each digital signal represents the difference in intensity between the particular picture element and a preceding picture element having a predetermined spacing from the particular element of the image in the same frame, and means is provided for controlling the means for producing digital signals to smooth the transitions between the updated and unaltered digit groups.

Preferably each of the stored digit groups represents the difference in intensity between the particular picture element and a preceding picture element having the predetermined spacing from the particular element in the same frame; that is to say the digit groups are coded in differential pulse code modulation (DPCM). The use of differential coded digit groups for storing the image has the advantage that the digit groups can be smaller than they would be if they directly represented the intensities of the elements, for the same quality of image reproduction. The picture elements that have been found to be subject to change in any one frame may be joined in clusters with adjacent picture elements not subject to change by the detecting means and digital signals produced for updating the digit groups corresponding to all of the elements in a cluster. The clusters will be arranged to group together, possibly into a single group, the picture elements which are subject to change, and thereby reduce the number of transitions between updated and unaltered digit groups, so simplifying the smoothing of these transitions.

The controlling means may be such as to select picture elements in which no change in intensity has occurred since the previous frame, being elements preceding or following elements in which such a change has occurred, and to cause the production of digital signals in respect of these elements. The controlling means may alternatively or additionally modify the values represented by the digital signals at the transitions between updated and unaltered digit groups.

The parts of the image not subject to change as stored by the storing means are not updated in the system just described, and consequently may be subject to some degradation over a period of time. In order to overcome this difficulty it may be arranged that few lines of the image be updated in each frame period regardless of whether the picture elements are changing or not, so that over an interval of, say, three seconds, the entire image as stored by the storage means is renewed.

In order that the invention may be fully understood and readily carried into effect it will now be described with reference to the accompanying drawings in which.

It is assumed in the following description that the video signal input is in the form of a four-bit DPCM signal, and the apparatus to be described is arranged to transmit only the video signals relating to areas of movement in the image, it being an object of the example described not to decode and recode the DPCM signal within the transmission path. The importance of this last mentioned point arises because iit is likely that in a video telephone system the short distance transmission of the video information will be by DPCM signals, but over the trunk network the more expensive and more efficient interframe coding will be employed to make fuller use of the trunk lines. As will be apparent from the following description the DPCM signals will in fact be decoded for the purposes of determining the transition points between stationary and moving areas of the image, but these are outside the transmission path and are simply used to control the changeover from one mode to the other. Therefore the equipment to be described satisfies the requirement that the degradation resulting from decoding and recording of the DPCM signals should be avoided. The image is assumed to have 256 picture elements per line and all signals are processed and stored in parallel-serial storage. For transmission along a link appropriate modifications would have to be made to the shifting registers and the details of the logical circuitry.

Figure 1:
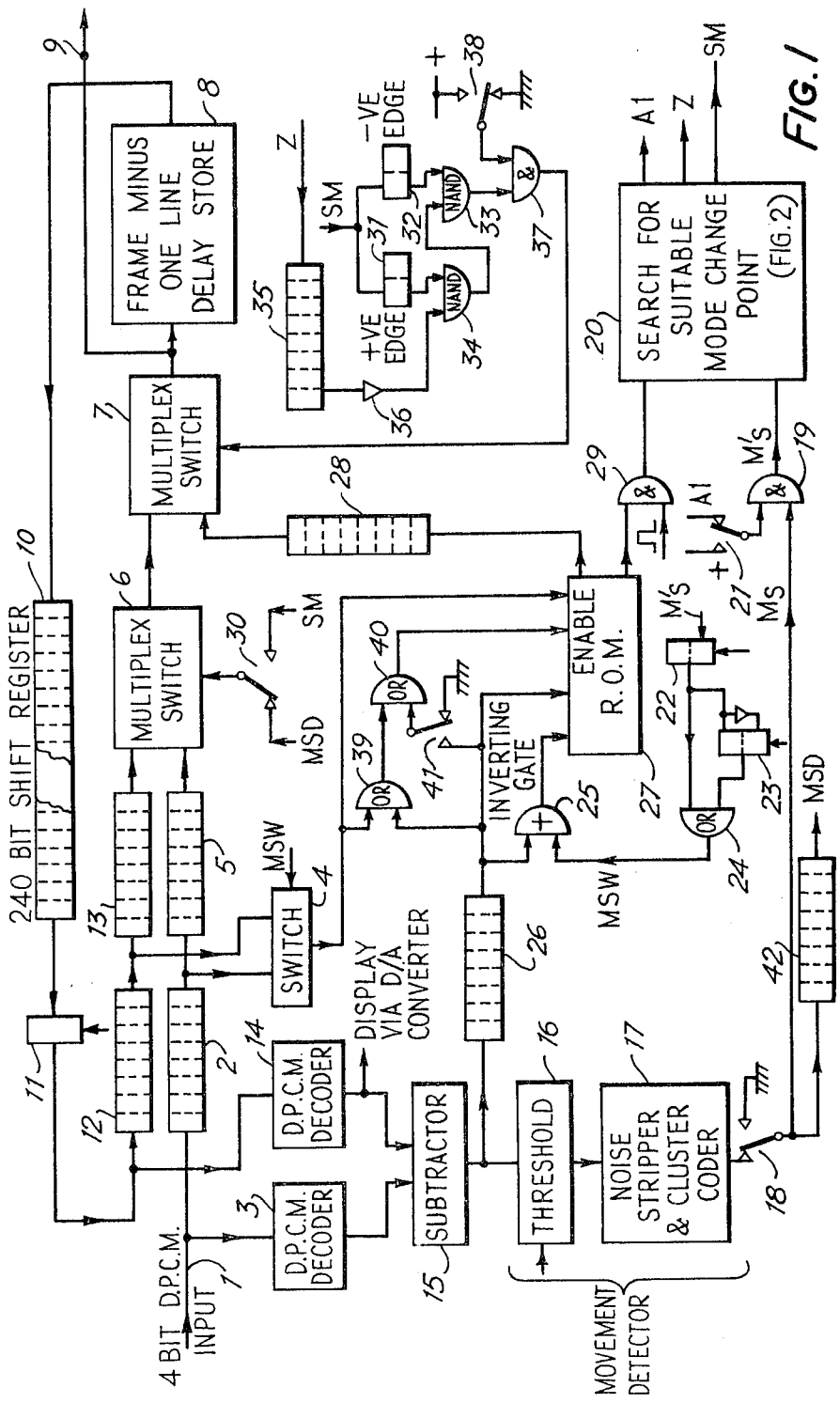
FIG. 1 is a diagram mainly in block form of one example of apparatus for a transmitter according to the invention.

Referring now to FIG. 1, the four-bit DPCM video input signal enters over an input line 1 and is applied to the input of a shift register 2 and a DPCM decoder 3. The output signals from the shift register 2 are applied to a multiplex switch 4 and the input of an another shift register 5. The output signals from the shift register 5 are applied to an input of a first multiplex switch 6. The output of the first multiplex switch 6 is applied to an input of a second multiplex switch 7, from which the output is applied to a frame memory store 8 capable of storing in four-bit DPCM code of the picture elements of one frame of the image less one line. The output of the switch 7 also provides the output of the circuit at a terminal 9. Signals read from the memory 8 are applied via a 240 bit shift register 10, a retiming storage element 11 and two shift registers 12 and 13 in tandem to a second input of the switch 6. The signals from the element 11 are also applied to a DPCM decoder 14. The output of the shift register 12 also provides a second input to the switch 4. For monitoring purposes display means not shown in the Figure may be connected to respond to the output signals from the decoder 14 via a suitable digital to analogue converter. The decoder outputs of the decoders 3 and 14, both in the form of eight-bit PCM coding, are applied to a subtractor 15 which produces a difference signal output which is applied to a movement detector unit including a threshold circuit 16 and a noise stripper and cluster coder 17. This unit will be described in detail with reference to FIG. 3. A stationary/moving signal MS is produced as an output from the movement detector and is applied via a switch 18 and a gate 19 as an input to a unit 20 to be described later with respect to FIG. 2, for searching for the most favourable instants for transition between the two modes of operation to smooth the effect of these transitions as far as possible. The second input to the gate 19 is either a positive voltage or a signal A1 derived from the unit 20 derived via a switch 21. The output of the gate 19 is a signal M's and is also applied via trigger circuits 22 and 23 and an OR-gate 24 to produce a signal MSW, which is applied to an inverting gate 25 and to operate the switch 4. The output of the subtractor 15 is applied via a shift register 26 to the gate 25 and also to an address input of a read only memory (R.O.M) 27. The output of the gate 25 is also applied as an address input to the memory 27. Another component of the address input of the memory 27 comes from the switch 4. As will be explained in detail later, at each address of the read only memory 16 there is stored an eight-bit word, and four bits of a selected word are applied as an input to a shifting register 28 the output of which forms the second input of the switch 7. The other four bits of the selected word are applied via a gate 29 as an input to the search unit 20. The unit 20 produces three outputs, the signal A1 already mentioned and signals SM and Z. One output is the modified stationary/moving signal SM which indicates the actual time that the changeover from one mode to the other is to take place, and this signal is applied as an input to a switch 30 and also as the input to two triggers 31 and 32. The output signal of the switch 30 is applied to control the multiplex switch 6. The multiplex switch 7 is controlled by the output of an AND-gate 37 connected to the output of a NAND-gate 33 which receives as one input the output of the trigger 32 and an another input the output of another NAND-gate 34 which is responsive to the ouptut of the trigger 31. The signal Z from the search unit 20 is applied via a shift register 35 and an inverter 36 to control the gate 34. The gate 37 is controlled by a switch 38 having terminals connected to earth and a positive voltage respectively.

A OR-gate 39 is connected to receive the most sigificant digits from the outputs of the switch 4 and the shift register 26. The output of the gate 39 is connected via an OR-gate 40 to an enabling input of the memory 27. A second input of the gate 40 is connected to a switch 41 having contacts connected respectively to earth and to receive the digits of lower significance in the output of the shift register 26.

A signal MSD, derived from the output signal MS of the movement detector by delaying it by passage through a shift register 42, is applied as a second input to the switch 30.

The operation of the frame store 8 and the shifting registers 2, 5, 10, 12 and 13 and the element 11 is synchronised with the DPCM input signals over the line 1 in such a way that the output from the memory store 8 applied to the decoder 14 via components 10 and 11 represents the same element of the image as does the input signal applied to the decoder 3 at the same time. The shift registers 2, 5, 10, 12 and 13 are provided to enable the signal processing performed by the components in the lower half of the drawing to be carried out and entered into the memory store 8 at the appropriate time. Thus the writing circuits of the store 8 (which are not explicitly shown in FIG. 1) operate a line later than the reading circuits because of the delays of the shift registers. The details of the clock circuits and other timing controls are not shown in the Figure but it is believed that they will be apparent to the reader.

The apparatus shown in FIG. 1 can operate in two different ways depending upon whether the particular part of the video signal relates to a moving part of the image or not. The frame memory store 8 in the transmitter is a duplicate of a similar store in the receiver and is used to correct for the errors which would occur in the receiver store if the correction circuits provided by the invention were not employed.

If the input signal relates to a part of the image which contains no movement the DPCM encoded picture elements stored in the store 8 are read out from that store and are rewritten into it after passage through the shifting registers 10, 11, 12 and 13 and through the multiplex switches 6 and 7. The input signals to the store 8 form the output of the circuit at the terminal 9, but not all of these are transmitted to the receiver as will be explained later.

Assume now that the input signals applied to the line 1 include some part of the image containing movement, with the result that the eight-bit PCM output produced by the decoder 3 will differ from the eight-bit PCM output produced by the decoder 14, which represents the same picture elements as the input signal but in the preceding frame. The movement will produce an output from the subtractor circuit 15 in excess of the threshold value of the circuit 16 which produces an output causing the generation of a signal MS from the unit 17 when the movement is detected, the signal persisting for the duration of the detected movement and possibly also including some picture elements where no movement was detected as a result of the "clustering". If there were no difficulty in substituting the input signals on the line 1 for those stored in the corresponding locations of the store 8 the signal MSD could be used to operate the switch 6 and feed the input signals into the store 8 through the switch 7. In fact the swtich 6 is controlled by SM which is a version of delayed MS signal MSD, stretched to allow corrections to be made in the transitional regions.

At this time the DPCM encoded picture elements displaying movement are transmitted so that the receiver store is updated simultaneously with the store 8. In order to overcome the differences which can occur at the boundary between the stationary and moving areas of the image the search unit 20 controls the actual time of occurrence of the modified signal SM relative to the signal MS from the movement detector indicating the time of occurrence of the first picture element including sufficient change to indicate movement. In addition, a four-bit DPCM coded word is generated at the transition by the read only memory 16 having a value such as to reduce the errors arising from the differences between corresponding DPCM values in consecutive field scans as far as possible. This new four-bit word is directed through the shift register 28 and is introduced by switch 7, in place of the four-bit word existing at the transition at the input of the store 8, and is also transmitted to the receiver.

One purpose of the noise stripper and cluster coder 17 is to determine just which of the differences from the subtractor circuit 15 are the result of movement and which the result of noise. The cluster coder is an arrangement for grouping together the moving areas into clusters so as to reduce as far as possible the number of transitions between stationary and moving parts of the image, without requiring on average too much information to be transmitted to the receiver. The operation of the cluster coder will be described in detail with reference to FIG. 3.

Since the actual signal level at any picture element is represented by eight bits, it follows that there are 256 levels and the threshold detector 16 is arranged to respond to differences which exceed two or three levels as described below, all differences below this threshold being assumed to be due to noise. The quantizing of the original video signal results in the introduction of noise and this noise is magnified by the differential coding so that a large number of extraneous frame differences can be produced even with a relatively high threshold.

In order to keep the differences occurring at a transition as low as possible the apparatus is arranged to restrict the mode change points, that is to say the points at which the image is assumed to change from stationary to moving and vice versa to such points where the DPCM signal occupies its inner levels, that is to say in the lower detail regions of the image and where the frame differences are small. In addition, the actual transition point is arranged to lie in what is judged to be a stationary area of the picture so that when a signal MS is produced indicating the detection of movement the signal produced by the search unit 20 is arranged to correspond to an earlier point in the scan of the image, this being possible because of the use of the shifting registers 2, 5, 12 and 13. Similarly at a transition from moving area to stationary area the modified signal SM corresponds to a later point than does the signal MS.

Figure 6:
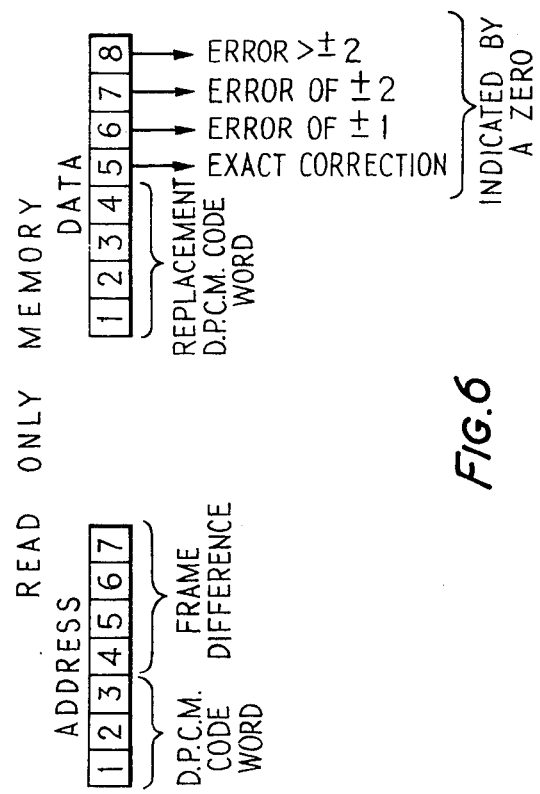
FIG. 6 illustrates the action of the Read Only Memory used in FIG. 1.

In order to reduce the error which would occur if the four-bit DPCM input signals were simply applied to the store 8 in place of the recirculated output of that store, the error arising from the normally occurring differences between DPCM values corresponding to the same point in consecutive scans, it is proposed to use the read only memory 27 to produce a four-bit DPCM transitional element which is arranged to reduce this error as far as possible, and preferably to zero. The choice of the new element is achieved by addressing the read only memory 27 with the three least significant bits plus the sign of the output from the subtractor circuit 15 received via the sign of the output from the subtractor circuit 15 received via the shift register 26 and with the two least significant bits plus the sign of either the input signal or the output signal of the store 8 from the switch 4 depending on whether the transition is from stationary to moving or vice versa. Thus the read only memory 27 has a seven-bit address input and container 128 words. Each word of the memory 27 includes eight bits, of which four represent the new four-bit DPCM signal and are applied to the switch 7 via shift register 28, and the remaining four indicate whether the new DPCM signal gives an exact correction or contains an error and is fed to the search unit 20. In FIG. 6, which represents a word of the memory 27, the presence of a zero in one of the positions 5 to 8 is used to indicate the magnitude of the error resulting from the use of that four-bit DPCM code word, a zero in position 5 indicating an exact correction, a zero in position 6 indicating an error ±1, a zero in position 7 indicating an error ±2 and a zero in position 8 indicating an error greater than ±2.

In order to keep the read only memory 16 down to 128 addresses the five most significant bits of the difference signal output of the subtractor circuit 15 and the most significant bit of the DPCM signal selected by the switch 4 are combined in the OR-gate 39 to produce a signal which passes through the gate 40 to disable the memory 27, unless these are all zero, with the result that if the transition is in a region of much detail or the differences are very large the memory 27 is prevented from producing an output word. In practice it is found that only rarely is the memory 27 disabled. When disabled all of the outputs of the memory 27 are held at 1. With the switch 41 in the left-hand position the lower significance digits of the difference signal are applied via the gate 40 to disable the memory 27, so that it is permitted to operate only if the difference is zero; if this alternative is used the memory 27 can have fewer addresses.

The sign digit of the difference output from the subtractor 15 is applied to an input of the inverting gate 25 so that the sign digit is inverted during a moving part of the picture by the signal MSW, derived from the signal M'S. The output of the gate 25 is applied to the memory 27 so that the effective sign of the difference is independent of whether the transition is at the start or finish of a moving part of the picture. The lowerr significance digits of the difference output from the subtractor 15, subject to any sign modification as just described, together with the output from the switch 4, therefore form the address input of the memory 27. The switch 4 is provided because in the case of a stationary to moving transition the correction is based on the input signal, that is to say the moving part of the picture, and in a moving to stationary transition the stationary signal is used because the transition is based on the stationary element. The switch 4, which is also controlled by the signal MSW, operates to apply the appropriate DPCM coded picture element to the memory 27.

As described above, the address information applied to the memory 27 reads the eight word stored at the selected address, of which four bits represent the modified transitional element used to smooth the transition from moving to stationary or stationary to moving, and these four bits are applied to the switch 7 through the shifting register 28. The actual time of transition from moving to stationary or vice versa depends upon the magnitude of the difference between the moving and stationary elements and also the amount of detail in the vicinity of the transition point, as represented by the DPCM coded signal from the switch 4, and as described above the search unit 20 looks for a suitable time before the detection of a statonary to moving transition and for another suitable time after the detection of a moving to stationary transition and produces an output signal SM occupying the interval between these times. The signal SM is produced throughout a moving part of the picture and is applied via the switch 30 to cause the switch 6 to select the input signal elements rather than those fed back from the store 8 via the registers 10, 11, 12 and 13. To introduce the transitional elements the switch 7 receives a signal from the gate 37 at the start and finish of the SM signal and thus enables the modified element from the memory 27 to be fed through the switch 7 into the store 8 instead of the output of the switch 6.

The output of the multiplex switch 7, which is connected to the output terminal 9, consists of bursts of DPCM coded picture elements representing the updated elements of the memory 8, as well as the recirculated DPCM coded elements which are being regenerated.

The signals controlling the multiplex switches 6 and 7 could be combined with the scanning circuits for the memory 8 to produce address information identifying the elements of the lines to which the updated information relates. Means, not shown, could be provided effective on the output at the terminal 9 for suppressing the data which is merely recirculated and for substituting the address information. As mentioned above, a few lines in each frame could be added to the signals at terminal 9 for transmission over a line that the entire frame is sent over to a receiver a period of, say, three seconds, and any necessary address data could also be transmitted.

With regard to the operation of the search unit 20, this operates in two different ways depending upon whether the transition is at the beginning or end of a moving part of the picture. In the case of the beginning of a moving part, that is to say at a stationary/moving boundary, the unit has to store data about points in the stationary area prior to the transition and search among these for a suitable mode change position. For a moving/stationary boundary the system remains in the moving mode and waits until a suitable subsequent point in the stationary port of the picture occurs for the mode change to take place. As referred to above, the transitional picture elements are entered by means of the switch 7 in response to an output from the gate 37, which receives pulses from the gates 33 and 34 derived from triggers 32 and 31 in response to negative and positive-going edges respectively of the signal SM. If no change point is found by the unit 20 having a sufficiently low error, then a signal Z is produced by the unit 20 which is applied through the shifting register 35, acting as a delay to cause the transition to occur as specified by M'S.

Figure 2:
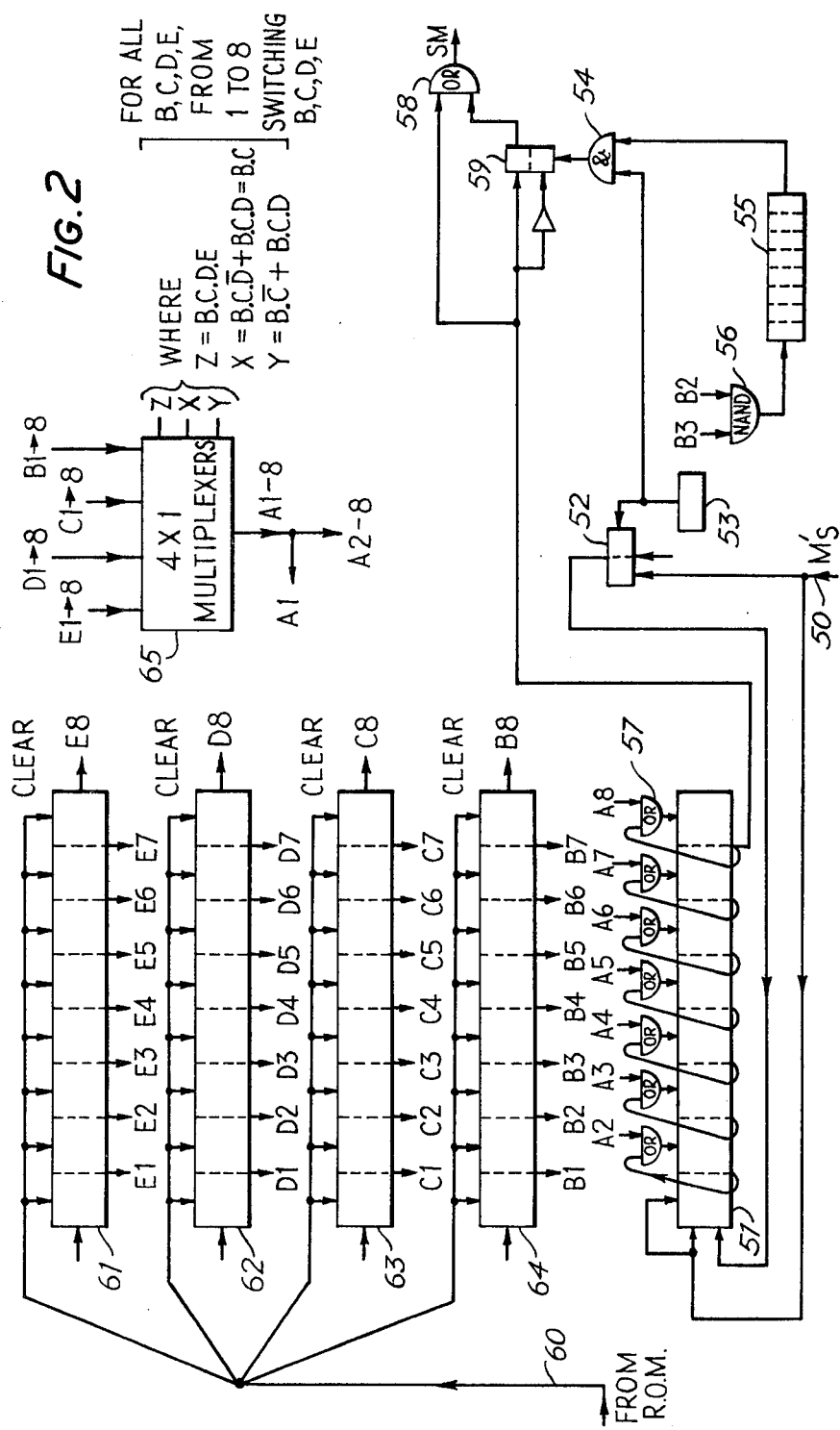
FIG. 2 shows details of the part of the apparatus shown in FIG. 1, the purpose of which is to search for a suitable mode change point to smooth the transition between the updated and unaltered digit groups.

Referring to FIG. 2, which shows one form of the search unit 20 of FIG. 1, the signal M'S is received over a line 50 and applied to the first stage of a shifting register 51, and also to set a trigger 52, the output of the trigger 52 is connected to the register 51 to cause it to enter the data applied to it. A pulse generator 53 is connected to the trigger 52 to clear it, and also applies an input to an AND-gate 54. A second input of the AND-gate 54 is received from a shifting register 55, to which input signals are applied from a NAND-gate 56. In the register 51 connections between adjacent stages include OR-gates 57 having respective inputs A2, A3 . . . A8. The final stage of the register 55 is connected to an input of an OR-gate 58 and also to set a trigger 59 which is clocked by the output of the gate 54. The output of the gate 59 is connected to a second input of the OR-gate 58. The output of the OR-gate 58 is the signal SM.

The four bits output from the memory 27, representing the magnitude of the error at a particular transition point, are applied via a conductor 60 to clear a respective one of four shifting registers 61, 62, 63 and 64, whenever a zero occurs as one of the four bits. The four registers 61 to 64 receive a succession of 1's at their left-hand ends which are stepped progressively to the right at each digit time with the result that each of the registers stores a number of 1's from its left-hand end which indicates the number of digit times since a zero occurred in the corresponding digit of the output from the store 27. Each of the registers 61 to 64 has eight stages and the registers produce outputs E1 ... E8, D1 ... D8, C1 ... C8 and B1 ... B8 respectively. A four-way multiplex switch 65 is connected to receive the outputs E1 to E8, D1 to D8, C1 to C8 and B1 to B8 from the registers 61 to 64, and produces outputs A1 to A8 under the control of signals X, Y and Z, where $X = B.C.\bar{D} + B.C.D. = B.C$
$Y = B.\bar{C} + B.C.D$
$Z = B.C.D.E$ where $B = B1.B2.B3 \ldots B8$
$C = C1.C2.C3 \ldots$ etc.

The signals X, Y and Z controlling the application of B1 to B8, C1 to C8, D1 to D8 and E1 to E8 selectively to the inputs A1 to A8 by means of the multiplexers 65 are such that the signal X is produced if all of the digits B are 1's and all of the digits C are also 1's. The signal Y is produced if all of the digits B are 1's and at least one of the digits C is a 0 or all of the digits B, C and D are 1's. The signal Z is produced if all of the digits B, C, D and E are 1's. Thus the signal indicates that there is not transitional element which does not produce a large error, outside the range of the search unit. As shown in FIG. 1, the signal Z is used to cause the transition to take place at the first element where movement was detected, the error arising having to be accepted because the circuit is unable to correct it.

If there is a digit in the register 64 which is zero, then the X and Y signals will have the values 0 and 0, and therefore the multiplexers 65 will connect the output B2 to B8 to the inputs A2 to A8, so transferring the B digits into the Register 51. If however, all of the B digits are 1 and one of the C digits is a 0 then X is 0 and Y is 1 so that the C outputs are connected to the A inputs. X is 1 and Y is 0 when all of the B and C digits are 1's but one of the D digits is a 0, so that the D outputs are connected to the A inputs. Both X and Y are 1 when all of the B, C and D digits are 1's so that the E outputs are connected to the A inputs.

Supposing that the transition from stationary to moving coincides with a point selected from the memory 27 which introduces no error, so that the signal SM occurs when the first element of the moving part reaches the multiplex switch 6. This means that the search unit 20 must impose a delay of eight digit times on the signal M'S in producing the signal SM, because of the eight digit time delay imposed by the shifting registers 5 and 13. This is achieved by the signal M's introducing a 1 into the left-hand stage of the shifting register 51 which is stepped along and appears from the righthand stage eight digit times later and then passes out through the OR-gate 58 as the signal SM. If, however, the transition can only be made with zero error at a point four digits earlier than the stationary to moving transition, then when the stationary to moving transition is detected there will be transferred into the register 51 from the register 64 four 1's in the left-hand stages of the register. As a result of this the change from 0 to 1 in the output at the right-hand end of the register 51 will be detected four elements earlier and consequently signal SM produced that much earlier. As a result of the operation of the multiplexers 65 under the control of the signals X, Y and Z, the signal SM is generated up to eight elements earlier so that the transition is caused to take place when the lowest error occurs within the eight digit period.

The delaying of the moving to stationary transition is much simpler to achieve because the unit 20 is arranged to continue to produce the signal SM after the end of the moving part until a transition can be made with zero error.

Alternatively, as well as zero error a transition could be allowed with a small predetermined error of say ± 1, by passing signals from digit positions 5 and 6 as shown in FIG. 6, from the Read Only Memory 27 through a NAND-gate. This has the effect of reducing the amount of stretching at the end of a cluster and thus reduces the extra stationary data requiring transmission.

For the transition to take place when the error is zero the gate 56 is arranged to produce a 1 output when a zero is received from the memory 27 in the digit position 5 (or 6 if an error ± 1 can be tolerated) as shown in FIG. 6. Then this zero progresses through the shifting register 55 and by means of the AND-gate 65 resets the trigger 59 thus terminating its output, trigger 59 having maintained the signal SM during the moving part of the image.

Referring again to FIG. 1, the signal MSD from the shifing register 42 which is applied to a contact of the switch 30 enables the multiplex switch 6 to operate so as to cause the stationary to moving and moving to stationary transitions to take place when they are detected by the movement detector. This is normally only provided for experimental purposes and testing. The switch 30 may be provided with a further position to receive pulses timed with respect to the scanning of the image so as to permit the updating of the stored data in the store 8, a few lines in each frame, as described above; so that over a period of, say, three second, the entire contents of the store is renewed. The circuits required for achieving this are not shown in FIG. 1 but may consist of a pulse generating circuit which produces the required width of pulse in every frame.

Figure 3:
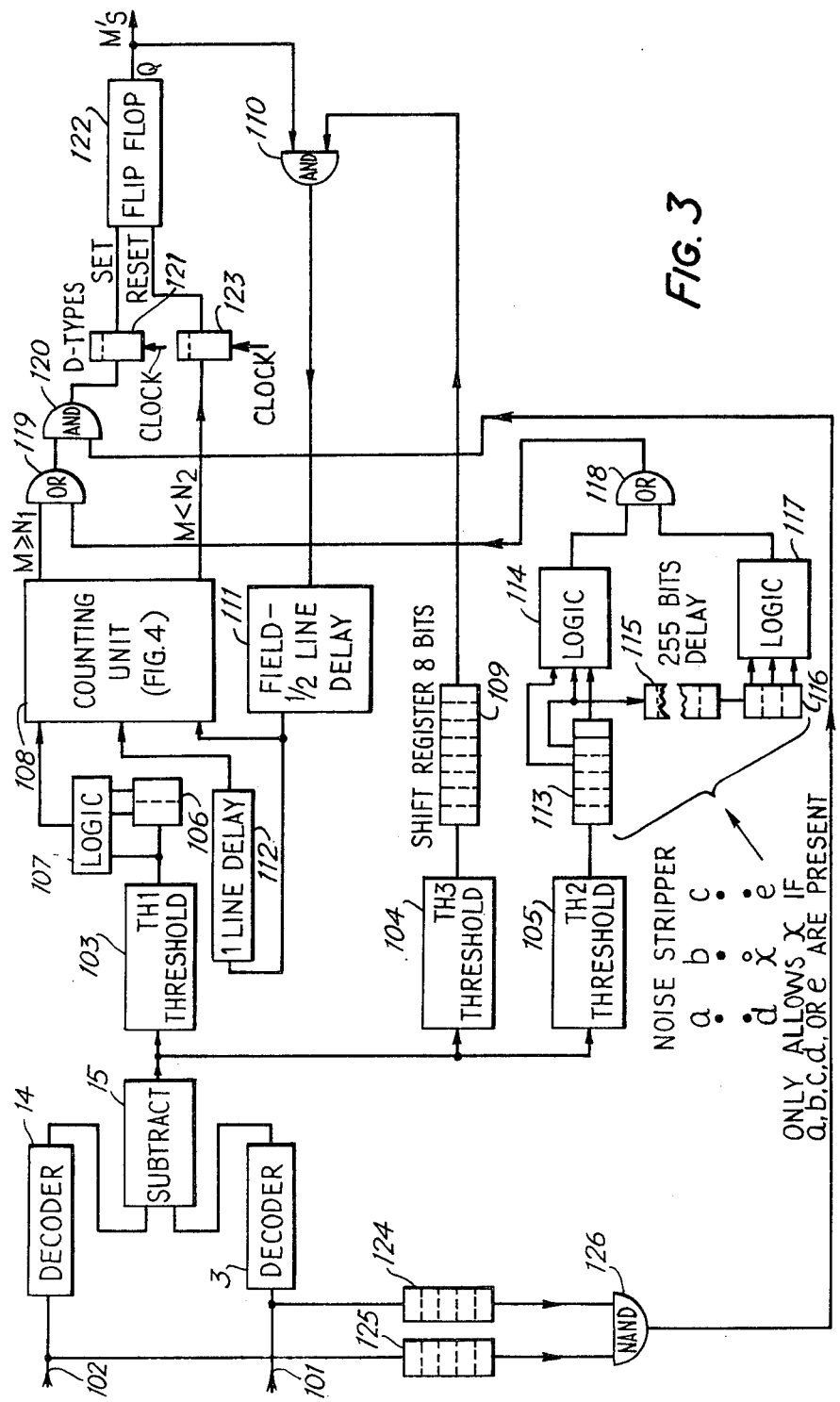
FIG. 3 is a diagram showing more detail of the movement detector shown in FIG. 1.

The operation of the movement detector will now be described with reference to FIGS. 3 and 4. Although the movement detector as shown in FIG. 1 consists of a threshold unit 16 and a noise stripper and cluster coder 17, it cannot in practice be quite so simply divided, especially as part of the noise stripping operation depends upon the DPCM coded elements fed into the decoders 3 and 14. Therefore, FIG. 3 has a certain amount of overlap with FIG. 1, in that it includes the decoder 3 and 14 and their connections to the input terminal 1 and the element 11. These connections have the references 101 and 102 in FIG. 3. The subtractor 15 is also shown in FIG. 3 receiving as its inputs the outputs of the decoders 3 and 14. The difference signal output of the subtractor 15 is applied to three threshold circuits 103, 104 and 105, having thresholds TH1, TH3 and TH2 respectively. The output of the threshold unit 103 is connected to a two-stage shifting register 106 and a logic unit 107, to which the stages of the shifting register 106 are also connected. The output of the logic circuit 107 is connected to one input of a counting unit 108, which is shown in more detail in FIG. 4. The output of the threshold unit 104 is connected through an eight bit shifting register 109 to an input of an AND-gate 110, the output of which is connected to a delay line 11 which imposes a delay equal to one field time less half a line. The output of the delay line 111 is connected directly to the unit 108 and also through a one line delay 112 to the unit 108. The output of the threshold unit 105 is connected to a six bit shifting register 113, the last three stages of which have their outputs connected to a logic unit 114. The output of the fifth stage is also connected through a 255 bit delay line 115 to a three stage shifting register 116 the stages of which are connected to a logic unit 117. The outputs of the logic units 114 and 117 are connected to the inputs of an OR-gate 118, the output of which forms an input to an OR-gate 119 which receives as its other input an output from the counting unit 108. The output of the gate 119 is connected via an AND-gate 120 and a D-type bistable 121 to the setting input of a set/reset trigger 122. The reset input of the trigger 122 is connected to an output of the unit 108 via a second D-type bistable 123.

The conductors 101 and 102 are connected through five-stage shifting registers 124 and 125 to respective inputs of a NAND-gate 126. The output of the NAND-gate 126 forms the second input to the AND-gate 120.

Figure 4:
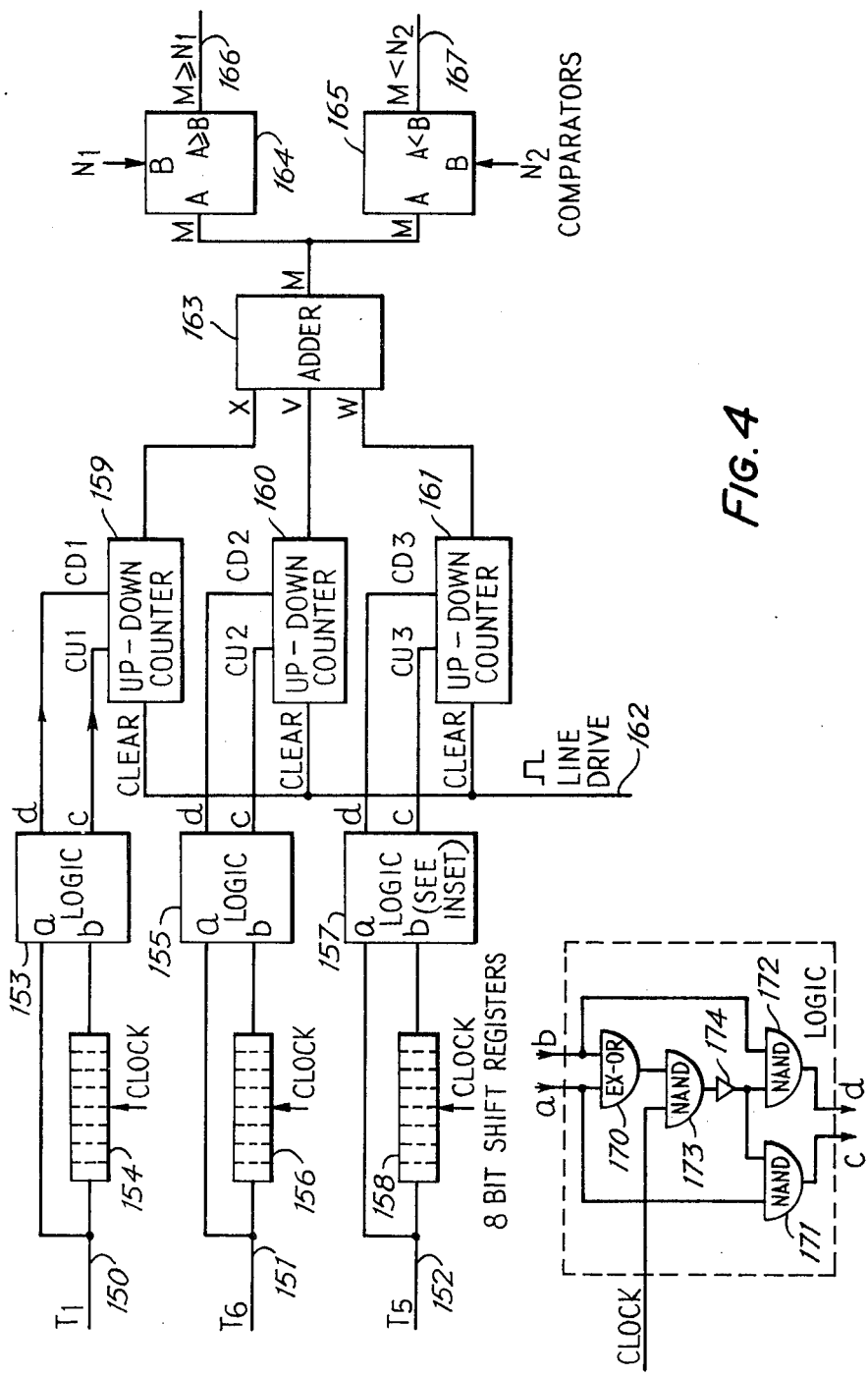
FIG. 4 shows in detail the counting unit of FIG. 3.

FIG. 4 shows the construction of the counting unit 108 and has three input conductors 150, 151 and 152 which are connected respectively to the logic unit 107, the output of the delay line 112 and the output of the delay line 111 of FIG. 3. The conductor 150 is connected directly to one input of a logic unit 153 and through an eight-stage shift register 154 to a second input of the unit 153. The conductor 151 is connected directly to an input of a logic unit 155 and through an eight-stage shifting register 156 to a second input of the unit 155. The conductor 152 is connected directly to one input of a logic unit 157 and through an eight-stage shifting register 158 to a second input of the unit 157. The two outputs of the logic units 153, 155 and 157 are connected to counters 159, 160 and 161 to cause these counters to count upwards or downwards. A conductor 162 is connected to the counters to clear them. The outputs of the counters 159, 160 and 161 are connected to respective inputs of an adder 163, the output of which is applied to two comparators 164 and 165 which compare the output of the adder with numbers N1 and N2 respectively. The comparator 164 produces an output if the output M of the adder 163 is greater than or equal to N1, this output appearing on a conductor 166 which is connected to an input of the OR-gate 119 (FIG. 3). The comparator 165 produces an output on a conductor 167 if the output M of the adder 163 is less than N2. The conductor 167 is connected to the D-type bistable element 123 of FIG. 3.

The contents of the logic units 153, 155 and 157 of FIG. 4 are the same and are shown in the diagram inset on FIG. 4. The input terminals of the logic unit are labelled a and b, of which a is connected to a respective one of the input conductors 150, 151 and 152, and b is connected to the output of a shifting register 154, 156 or 158. Within the logic unit the conductors a and b are connected as the two inputs of an exclusive OR-gate 170 and also as inputs to NAND-gates 171 and 172 respectively. The output of the exclusive OR-gate 170 is connected to an input of an NAND-gate 173, the second input of which is from a clock. The output of the NAND-gate 173 is connected via an inverter 174 to an input of each of the NAND-gates 171 and 172. The outputs of the NAND-gates 171 and 172 form the outputs of the logic unit and are respectively labelled c and d and are connected in the counting unit to cause the corresponding one of the counters 159, 160 and 161 to count upwards and downwards respectively.

In its operation the movement detector takes advantage of the fact that moving areas tend to be contiguous both spatially and temporally. Thus if movement occurs at a particular picture element, it is likely that other picture elements, which are both spatially and temporally adjacent to it, will also have movement. The movement picture therefore uses a high decision threshold for the detection of movement in regions of the picture that are previously stationary, and a low threshold in regions where movement has recently been detected.

The difference signal from the subtractor 15 is applied to the threshold detector 103, which has a threshold set at three levels out of the 256 possible for the eight bit output of the subtractor. The shifting register 106 and the logic unit 107 serve to reject isolated picture elements exceeding the threshold of the unit 103, since it is assumed they originate from signal noise rather than from a moving area. The counter unit 108 counts a number of picture elements in an eight by three block of elements adjacent to the element of immediate interest, and if the output of the counter is greater than or equal to 9 (the threshold N1 of the comparator 164 FIG. 4), then the flip-flop 122 is set and the stationary moving signal M'S assumes the 1 state to signify the start of a moving area. The flip-flop 122 can only be reset when the output of the eight by three counter falls below the lower threshold of 4 (referred to as N2) which is applied to the comparator 165 of FIG. 4. By choosing a relatively high threshold for N1, that is to say the value 9, the output signal of the logic unit 107, which is designed to indicate flat area movement on a single scanning line of an image, cannot by itself cause the signal M'S to assume the 1 state. Initially therefore the signal M'S can only be switched to the 1 state when the difference signal from the subtractor exceeds TH2, the threshold of the unit 105. The threshold TH2 is high (say, 10 levels) and is designed to indicate moving edges. The components 113 to 118 serve as a noise stripper to reject all isolated frame differences that exceed the threshold TH2 in a two-dimensional area of stationary elements. The logic 114 checks the adjacent elements in the same scanning line by responding to the outputs of the shifting register 113 and the logic unit 117 performs the same function for a line earlier in response to the outputs of the shifting register 116. The delay line 115 is the length of a single scanning line of the image less 1 picture element which is provided by shift register 116.

Once edge movement is detected and the flip-flop 122 set, the output signal of the logic unit 107 determines whether adjacent picture elements on the same line are to be treated as moving. The threshold TH3 of the unit 104 is low (say, 2 levels), so that the output of the unit 104 is more sensitive to movement and also more sensitive to noise than the output of the logic unit 107. The output of the unit 104 is only taken into consideration when the flip-flop 122 is set because of the connection of the output of this flip-flop to the AND-gate 110. After a field, because of the delay of the line 113, the other two inputs to the counter 108 will be receiving inputs so that the counter is responsive to three adjacent lines of the scan. Because of the effect of the AND-gate 110, some of the picture elements treated as moving as a result of the hysteresis within the device are eliminated and consequently the feedback loop around the counter is stabilised As a result of these various interactions the moving areas tend to be filled in and areas are designated as moving for a short while after they have become stationary. In one example the threshold TH1, TH2 and TH3 are fixed at 3, 10 and 2 levels respectively. If these three thresholds are too low then quantisation noise causes more areas to be treated as moving than necessary, and if they are set too high then slow moving and low detail area movement is lost; thus the choice of threshold is a compromise.

As the data for transmission from the transmitter of FIG. 1 is produced at an uneven rate it may be necessary to provide buffer storage in the output circuits (not shown) to enable data to be transmitted at a constant rate. The fullness of the output buffer will depend on the amount of data applied to it and this in turn will depend on the choice of the thresholds in the movement detector. The threshold could be made variable under the control of the state of fullness of the output buffer of the encoder, so that they can be made dependent on the speed of movement and consequently the accuracy of movement detection depends on the fullness of the output buffer. Thus as movement increases the amount of data sent to the buffer can be decreased by increasing the threshold and so retard the approach of buffer overload when the system is no longer able to cope with rapidly changing input pictures.

The noise stripping is effected in three separate and distinct ways. First of all, it is assumed that if two DPCM signals of high value occur at the same time in both the input signal and the signal fed back from the frame store 8, then there is a stationary edge present and any movement detected is due to quantising noise of the DPCM coding. Such signals are detected by combining the most significant digits incomming to the decoders 3 and 14 in the NAND-gate 126 after delaying the signals five digit times in the five-stage shifting registers 124 and 125 to match the delay through the counter unit 108. The gate 126 is such that it produces an output signal unless large value signals occur on both lines 101 and 102 when the gate 120 is disabled by the termination of the output from the gate 126 and no output signal is produced from the movement detector. The second way in which noise is stripped from the signal is by the logic unit 107 and the two-stage shifting register 106 which is such that unless a 1 signal output from the threshold detector 103 is preceded or followed by another 1, it is suppressed by the logic unit 107 and not applied to the counting unit 108. In this way isolated 1's are inhibited. The third way in which noise is stripped from the signal is by means of the components 113 to 118, the operation of which has been referred to above and will be seen to be analogous to the operation of the logic unit 107 and shifting register 106, except that it is somewhat more comprehensive in that it requires a 1 output from the threshold detector 105 to be preceded or followed by another 1 or to be adjacent to at least a single 1 in the preceding line of the scan. With the noise stripping just described a number of isolated noise spots and a certain amount of edge busyness are removed from the image thereby rendering it more acceptable. It will be appreciated that many alternative kinds of noise stripping could be employed using similar principles.

Although the invention has been described with reference to a specific example, it will be appreciated that many alternative arrangements using the invention are possible. Moreover the invention is applicable to television systems in using numbers of lines and numbers of elements per line differing from those described above. In addition, at other points where arbitrary thresholds have been set, it will be understood that other thresholds could be employed.

Figure 5:
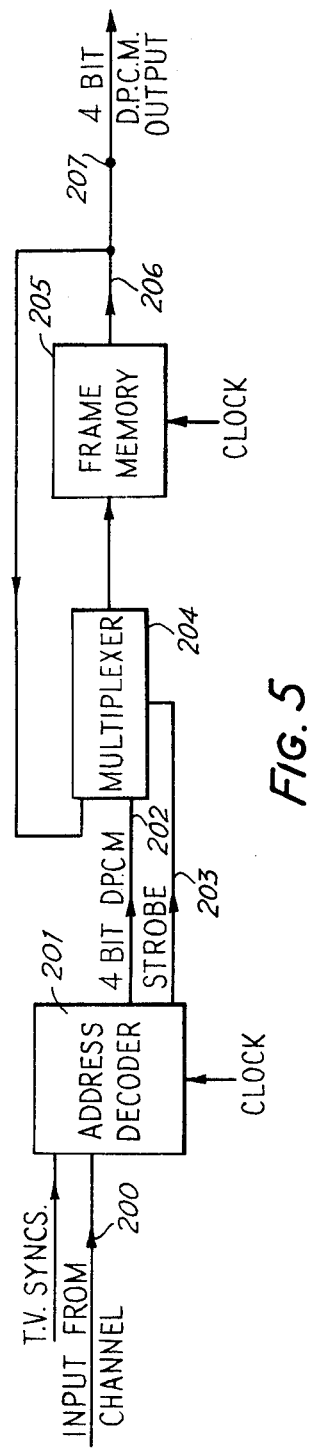
FIG. 5 is a block diagram of apparatus used in a receiver for a system according to the invention.

FIG. 5 shows in block diagrammatic form one example of a receiver suitable for receiving the DPCM coded output from the terminal of FIG. 1. Referring to FIG. 5, the DPCM coded input enters over line 200 and is applied to an address decoder 201 which separates the DPCM data from the transmitted address information and generates strobing signals timed with respect to the scanning of the frame to ensure the insertion of the new information in the correct places in the frame. The updating information is sent over a line 202 and the strobing information over a conductor 203 to a multiplexing switch 204. The output of the switch 204 is applied to a frame memory 205 similar to the memory 8 of FIG. 1 but storing a complete frame. The output of the memory 205 appears on a conductor 206 and is applied via an output terminal 207 for re-transmission or for application to a DPCM decoder for reproduction of the image. The conductor 206 is also connected as a second input of the multiplexer 204 for regeneration of those parts of the memory which are not being updated by new information over the line 202.

I claim:

1. A digital television system having a transmitter for transmitting digital signals depending on the light intensity of consecutive picture elements of a scanned image, and a receiver for reproducing the image in response to the digital signals, in which both the transmitter and the receiver include storage means for storing digit groups respectively relating to the intensities in the picture elements constituting one frame of the image, and the transmitter further includes means for detecting changes in intensity of picture elements from one frame to the next and for producing in each frame period digital signals for updating at least those of the digit groups stored in the storage means which correspond to picture elements whose intensity has changed, means responsive to the digital signals for updating digit groups stored in the storage means in the transmitter and for transmitting the digital signals to the receiver for updating digit groups stored in the storage means therein, wherein each digital signal represents the difference in/intensity between the particular picture element and a preceding picture element having a predetermined spacing from the particular element of the image in the same frame, and means is provided for controlling the means for producing digital signals to smooth the transitions between updated and unaltered digit groups in the storage means representing adjacent picture elements in the same line of the same frame.

2. A system according to claim 1 in which in the storage means each digit group represents the difference in intensity between the particular picture element and a preceding picture element having a predetermined spacing from the particular element of the image and in the same frame.

3. A system according to claim 2 wherein the means for detecting changes in intensity of picture elements from one frame to the next includes first means for sequentially producing signals representing the intensity of the consecutive picture storage elements of the scanned image, second means responsive to the digit groups stored in the storage means of the transmitter for sequentially producing signals representing the intensity of the consecutive picture elements of the image as scanned in a preceding frame, means for producing differences signals each representing the differences between a signal from the first means and a signal from the means representing the intensity of the same picture element in the two frames, and threshold means to which the difference signals are applied for producing an indication when the difference signals exceed a threshold value.

4. A system according to claim 3 wherein the threshold means includes means for maintaining the production of the indication when the difference signal represents zero for isolated picture elements or groups of picture elements.

5. A system according to claim 3 wherein the threshold means includes means for suppressing the production of the indication when the difference signal exceeds a limiting value for a single picture element in region of picture elements producing difference signals which are substantially zero.

6. A system according to claim 3 wherein the means for producing in each frame period digital signals for updating at least the corresponding digit groups stored in the storage means includes multiplex switch means controlled by the indication from the threshold means for enabling the recycling of the selected digit groups stored in the storage means and replacing others of the digit groups by input signals derived from the scanned image, the digital signals being the output of the multiplex switch means.

7. A system according to claim 6 wherein two delay means are provided connected to respective inputs of the multiplex switch means through which the digit groups and the input signals are respectively applied to the multiplex switch means, and the first and second means are respectively connected to the inputs of the two delay means, whereby the indication can be produced before the signals causing it to be produced are applied to the multiplex switch means.

8. A system according to claim 6 including means for applying to the multiplex switch means modified digit groups dependent on the digit groups from the storage means and the input signals, the multiplex switch means being arranged to replace a digit group from the storage means or an input signal by a modified digit group so as to reduce errors which would otherwise occur as a result of the replacement of a digit group from the storage means by an input signal.

9. A system according to claim 8 wherein the modified digit groups are stored in further storage means and associated with each modified digit group is a representation of the error resulting from the introduction of the particular modified digit group.

10. A system according to claim 8 wherein no modified digit group is produced if the difference signal is above a high threshold level.

11. A system according to claim 8 wherein the threshold means includes means for rendering the indication effective on the multiplex switch means to cause the replacement of a digit group from the storage means by a modified digit group for one or more picture elements producing difference signals below a threshold level which occur before a plurality of adjacent picture elements for which difference signals above the threshold level are produced.

12. A system according to claim 11 wherein the number of picture elements producing difference signals below a threshold level which occur before the adjacent picture elements for which difference signals above the threshold level are produced, is chosen to produce the minimum error resulting from the replacement of a digit group from the storage means by an input signal or modified digit group.

13. A system according to claim 8 wherein the threshold means includes means for rendering the indication effective on the multiplex switch means to cause the replacement of a digit group from the storage means by a modified digit group for one or more picture elements producing difference signals below a threshold level which occur after a plurality of adjacent picture elements for which difference signals above the threshold level are produced.

14. A system according to claim 13 wherein the number of picture elements producing difference signals below a threshold level which occur after the adjacent picture elements for which difference signals above the threshold level are produced, is chosen to produce the minimum error resulting from the replacement of a digit group from the storage means by an input signal or modified digit group.

15. A digital television transmitter system for transmitting digital signals depending on the light intensity in consecutive picture elements of a scanned image, the transmitter system including means for storing digit groups respectively relating to the intensities in the picture elements constituting one frame of the image, means for detecting changes in intensity in the picture elements from one frame to the next and for producing in each frame period digital signals for updating at least those of the digit groups stored in the storage means which correspond to picture elements whose intensity has changed, means responsive to the digital signals for updating groups stored in the storage means, and means for transmitting the digital signals, wherein each digital signal represents the difference in intensity between the particular picture element and a preceding picture element having a predetermined spacing from the particular element of the image in the same frame, and means is provided for controlling the means for producing digital signals to smooth the transitions between updated and unaltered digit groups in the storage means representing adjacent picture elements in the same line of the same frame.

* * * * *